US007130820B2

(12) United States Patent
Song

(10) Patent No.: US 7,130,820 B2
(45) Date of Patent: *Oct. 31, 2006

(54) METHODS AND SYSTEMS OF ASSISTING USERS IN PURCHASING ITEMS

(75) Inventor: Zhengrong Song, Kirkland, WA (US)

(73) Assignee: Amazon.Com, Inc., Seattle, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/037,297

(22) Filed: Jan. 18, 2005

(65) Prior Publication Data

US 2005/0125309 A1    Jun. 9, 2005

Related U.S. Application Data

(63) Continuation of application No. 09/552,128, filed on Apr. 19, 2000, now Pat. No. 6,865,546.

(51) Int. Cl.
    *G06Q 30/00*  (2006.01)
(52) U.S. Cl. ...................................................... 705/26
(58) Field of Classification Search .................. 705/26, 705/27
    See application file for complete search history.

(56) References Cited

U.S. PATENT DOCUMENTS

| | | | |
|---|---|---|---|
| 4,870,579 A | | 9/1989 | Hey |
| 5,383,111 A | * | 1/1995 | Homma et al. ............... 705/27 |
| 5,583,763 A | | 12/1996 | Atcheson et al. |
| 5,848,396 A | | 12/1998 | Gerace |
| 5,909,023 A | | 6/1999 | Ono et al. |
| 5,983,200 A | * | 11/1999 | Slotznick ..................... 705/26 |
| 6,298,348 B1 | * | 10/2001 | Eldering ................... 705/36 R |
| 6,574,607 B1 | | 6/2003 | Carter et al. |
| 6,622,125 B1 | * | 9/2003 | Cragun et al. ............... 705/14 |

FOREIGN PATENT DOCUMENTS

GB    2 328 530 A  *  2/1999

OTHER PUBLICATIONS

"Gifted Solutions" article dated Oct. 19, 1999.*
"Gifts .com" screen shots captured via the WayBackMachine and dated Feb. 29, 2000.*
"ugive .com" screen shots captured via the WayBackMachine and dated Mar. 11, 2000.*
"*Gifted Solutions Announces Merchant and Portal Partners Using Its New Gift Service Engine*," Business Wire, dated Oct. 19, 1999.
"gifts.com" screen prints captured via the WayBackMachine (archive.org) and dated Feb. 29, 2000.
"ugive.com" screen prints captured via the WayBackMachine (archive.org) and dated Mar. 11, 2000.

* cited by examiner

*Primary Examiner*—Mark Fadok
*Assistant Examiner*—R. E. Rhode, Jr.
(74) *Attorney, Agent, or Firm*—Knobbe, Martens, Olson & Bear LLP

(57) ABSTRACT

One embodiment of the present invention is a system and method of determining the age of an item recipient, such as a gift recipient. The age range for the gift recipient is estimated based at least in part on a customer order history of gifts purchased by the customer for the gift recipient. At a first date, a customer order for a first gift for the recipient is received, where the first gift is associated with a first age appropriateness designation. At a second date, a customer order for a second gift for the recipient is received, where the second gift is associated with a second age appropriateness designation. An age range associated with the recipient is then estimated based upon at least the first age appropriateness designation and the second age appropriateness designation.

40 Claims, 6 Drawing Sheets

From: Amazon.com
Sent: Tuesday, January 4, 2000 11:36 AM
To: Ian Doe
Subject: Birthday Reminder

Birthday Reminder

Hello Ian Doe. —110

We'd just like to remind you that an important event is upcoming —108— for Jacob Doe. Yes, time flies, and sometime in the next few weeks, it will be Jacob's 5th Birthday! —102 / 104

—106— Below is a list of past gifts you have bought for Jacob:

A. On November 20, 1995, you purchased Circus Rings by Sassy
B. On November 5, 1996, you purchased Activity Table Infant Toy by Fisher-Price
C. On November 7, 1997, you purchased DUPLO Light and Sound Dump Truck by LEGO Systems
D. On November 3, 1998, you purchased Building Set (450 pieces) by T-N-T International Inc.

You can find out about some great gifts for a 5 year old like Jacob by clicking on Toys and Books for Jacob! —114

Correct Jacob's age —116

Correct or Specify Jacob's Birthday —118

*FIG. 1*

METHODS AND SYSTEMS OF ASSISTING USERS IN PURCHASING ITEMS

PRIORITY CLAIM

The present application is a continuation of U.S. application Ser. No. 09/552,128, filed Apr. 19, 2000, now U.S. Pat. No. 6,865,546 the entirety of which is incorporated herein by reference.

BACKGROUND OF THE INVENTION

1. Field of the Invention

The present invention is related to systems and methods for obtaining information regarding an item recipient, and more specifically, to methods and systems for obtaining information regarding an item recipient and for assisting users in purchasing items for the item recipient.

2. Description of the Related Art

Consumers are increasingly shopping and purchasing items from on-line merchants over the Internet. The Internet provides consumers access to a wealth of products for all types of peoples and age ranges. Often, consumers are searching for products for a user or an intended recipient within a certain age range. For example, grandparents may be searching for a product, such as a toy, appropriate for a two-year old grandchild. Many sites allow consumers to activate a link to products intended for a certain age group. In this example, a toy merchant site may have links for toys intended correspondingly for children in the age ranges of 0–1 year, 1–2 years, 3–5 years, and so on. By clicking on the 1–2 year link, the customer is presented with one or more toys intended for that age group. The customer may also directly provide the gift recipient's birthday for future reference, so that the merchant can send out yearly birthday reminders to the customer.

The conventional processes described above disadvantageously require customer effort. For example, these conventional processes require customers to actively select an age group link to view age appropriate items. Furthermore, in order to receive birthday reminders, the customer has to actively provide the date of the birthday to the merchant. Many customers will not take the time to provide such birth dates, and so are deprived of receiving reminders.

By contrast, the present invention advantageously infers user or gift recipient ages and/or birthdays, and automatically presents age-appropriate recommended items for purchase, thereby providing a more efficient and pleasant shopping experience.

SUMMARY OF THE INVENTION

One embodiment of the present invention seeks to estimate or infer the age of an item recipient, such as a gift recipient or someone purchasing an item for themselves, based on an order history. The inferred information is used to automatically present users with recommendations and information on age appropriate items for the gift recipient or the purchaser. The inferred information may also be used to track the item recipient's age over time.

In addition, based on the order history, one embodiment of the present invention identifies an annual event date or period associated with gift giving to the gift recipient. The inferred information can be used to selectively present age appropriate items to the consumer during time periods proximate to the annual date or event. Based on the determined annual event date, reminders may be automatically provided to the consumer regarding the annual event date.

In accordance with one embodiment of the present invention, a system examines what types of items have been purchased as a gift by a consumer for a particular recipient. From that examination, the system infers or determines an age or a range of ages for the gift recipient, as well as possible events, such as a birthday, which may be associated with the gift giving. Using this inferred information, a merchant may present a consumer with a display or listing of recommended age appropriate gifts. The recommendations may be provided during a period related to the inferred event and the system may provide reminders to the consumer regarding the inferred event. In another embodiment, the consumer may be presented with the display or list of age appropriate gifts when the consumer visits the merchant's Web site, without regard to the inferred event.

For example, a customer may order an item from an Internet-based merchant using an electronic catalog. If, by way of example, the customer orders a toy as a gift for a recipient, the age designated by the manufacturer, merchant, or other source as appropriate for the item is recorded in association with the recipient's name, the date on which the item was ordered and/or the date for which delivery was requested, and the customer's name or other customer identification. An age/event inference application uses this information to infer the age of the gift recipient, and may also infer that the occasion for the gift giving is an annual event. If no age is designated as being appropriate for the item, then, in one embodiment, the age of the recipient will not be inferred from the item being purchased.

In addition, the inference of the recipient's age may be strengthened or the inferred age may change based on buying patterns for the recipient. For example, if one year a customer buys the recipient a gift suitable for a 2 year old, and the next year the customer buys the recipient a gift for a 3 year old, and so on, a very strong inference regarding the recipient's age may be made that the age of the recipient directly corresponds to the age suitability of the gift.

An item may be explicitly designated as a gift by the gift purchaser, or it may be inferred that a purchased item is a gift. The gift inference may be based on available information. For example, if the age suitability of the purchased item is for a child under a predetermined age, such as 8 years old, it may be inferred that the item is being purchased by someone other than the child as a gift for the child, even when the shipping address and the billing address are the same. The younger the age suitability of the item, the stronger the inference that the item is being purchased as a gift. In another example, if the shipping address is different than the billing address, an inference may be made that the item is being purchased as a gift. In addition, the gift inference may also be at least partly based on the type of item being ordered and/or the date of ordering. For example, it may be inferred that all toys are being purchased as gifts. In another example, if the item being ordered is perfume, and the date is one week before Valentine's Day, it may be inferred that the perfume is being purchased as a gift.

Of course, the same age inference techniques described above can also be used for consumers buying items for themselves, rather than as gifts.

If the customer requests that a greeting card and/or wrapping paper be provided with an item, it may be inferred that the purchased item is intended as a gift, and the type of card and/or wrapping paper requested may be used to infer or deduce the event which occasioned the gift. For example, if the customer ordered a birthday card and/or birthday gift wrapping, the age/event inference application will determine that the gift recipient's birthday is what instigated the gift giving. Similarly, if a customer provides a message to accompany the gift, such as on a card, the message may be parsed for key words, such as birthday or anniversary, and from those key words, an inference may be made as to the event that is associated with the gift. In addition, even if the type of event cannot be inferred, if the customer has sent a gift to the recipient for two or more years, at about the same time of year, the age/event inference application will infer that there is an annual event at about that time which occasions the giving of a gift.

The inferred event may also be stored in association with the recipient's name or other identification and the time period associated with the event. In one embodiment, even if the recipient age cannot be inferred from the gift item, if the event can be inferred then that inference will be recorded. Similarly, if the event cannot be inferred, but the recipient age may be inferred, then the age inference will be recorded.

Based on the inferred event, a reminder may be provided to the customer in following years regarding the inferred event. The reminder may be in the form of an e-mail or may be presented on a Web page associated with the merchant when the customer visits the corresponding Web site. If the event type has been inferred, the reminder may also note the event type. If the event date can be precisely identified, such as by examination of previous requested gift delivery dates or using other techniques, that date may be noted as well.

If an e-mail is used to provide the reminder, the e-mail may include a link to a page listing or displaying age appropriate gifts or items. Further, the types of gifts or items previously purchased for the recipient may be examined, and based on that examination, a page displaying or listing similar items may be presented as well. In one embodiment, both the inferred age of the recipient as well as the types of previous items purchased for the recipient may be used to automatically generate a list or display of suggested items that may make appropriate gifts.

In addition, the type of item purchased may be used to infer the gender of the recipient. For example, if the purchased toy is a dress for a doll, it may be inferred that the recipient is a girl. This inferred gender identification may be used to further refine the list or display of suggested gift items presented to the consumer.

If the consumer purchases gifts from a merchant for multiple recipients, the ages and any corresponding events may also be inferred if there is sufficient information. For example, one year a customer purchases a gift with an age appropriateness of 1 in February for a first recipient, and purchases a gift with an age appropriateness of 4 in May for a second recipient. The next year the customer purchases a gift with an age appropriateness of 2 in February for the first recipient, and purchases a gift with an age appropriateness of 5 in May for the second recipient. From this information, it may be inferred that the first recipient's birthday is in February and the first recipient is now 2 years old. Furthermore, it may be inferred that the second recipient's birthday is in May and the second recipient is now 5 years old. Using this inferred information, the merchant can appropriately list, highlight, recommend or otherwise emphasize gifts that are age appropriate for both the recipients each time the customer visits the merchant's Web site. Alternatively, gifts appropriate for the first recipient may be emphasized to the customer for a predetermined period before the first recipient's inferred birthday. Similarly, gifts appropriate for the second recipient may be emphasized to the customer for a predetermined period before the second recipient's inferred birthday.

BRIEF DESCRIPTION OF THE DRAWINGS

FIG. 1 illustrates a first exemplary e-mail message reminding a customer of an upcoming event associated with gift giving;

DETAILED DESCRIPTION OF PREFERRED EMBODIMENTS

Figure 2:
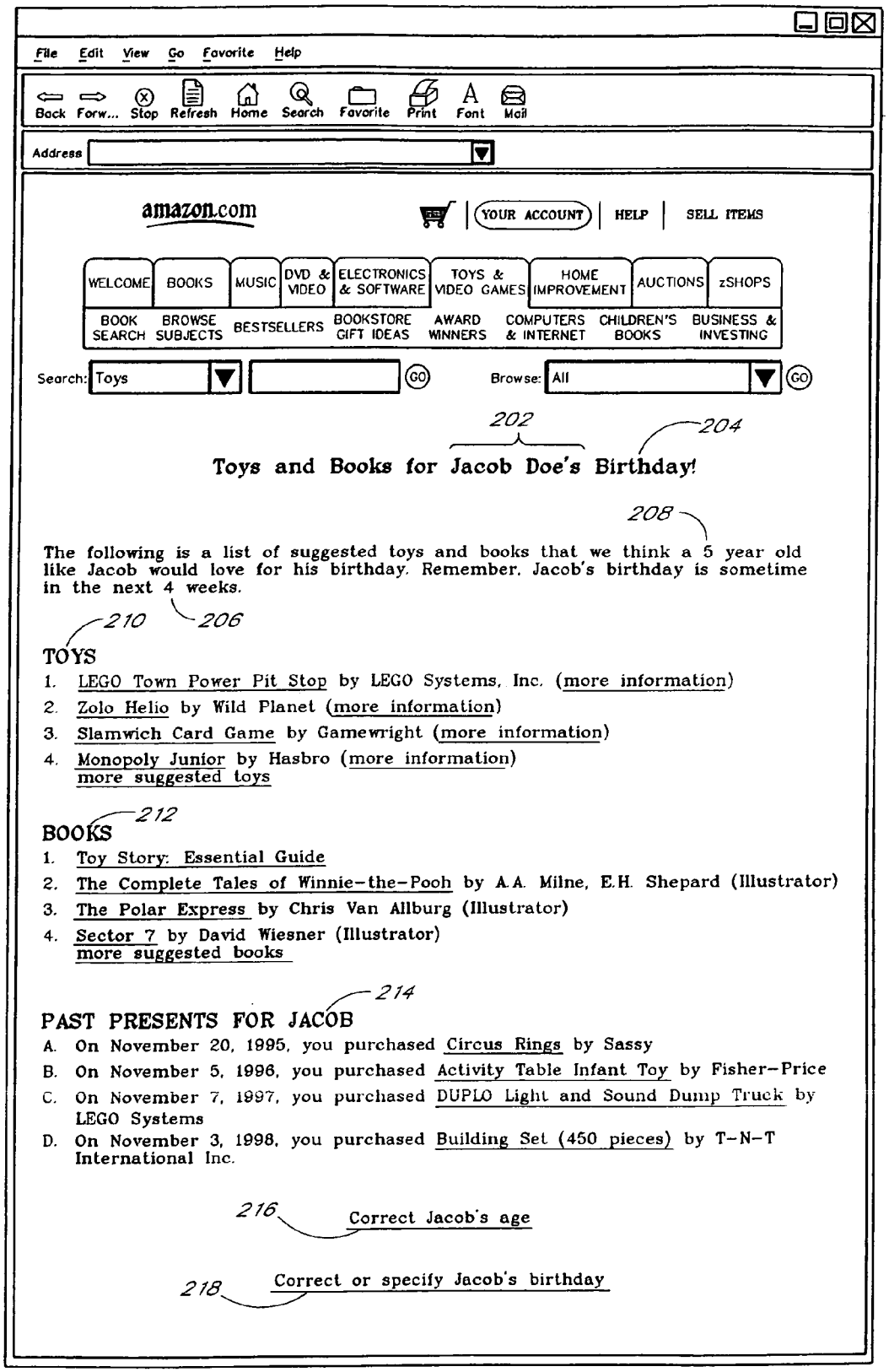
FIG. 2 illustrates an exemplary Web site page displaying age appropriate gifts for a recipient.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well. In the figures, words and phrases are underlined to indicate a hyperlink to a document or Web page related to the underlined word or phrase. In addition, unless otherwise indicated, the functions described herein are preferably performed by executable code running on one or more general purpose or computers or on servers.

The present invention relates to an age/event inference system and method that determines the age of a gift recipient and/or the date or period of a recurring event associated with gift giving to the gift recipient. This information is then used to track the recipient's age and automatically provide the gift giver at the appropriate times with information and recommendations regarding items which would make suitable, age appropriate gifts for the recipient. In addition, based on the determined event dates, reminders may be provided to the gift giver regarding the event date. Thus, the novel methods and systems disclosed herein advantageously provide a more pleasurable and efficient gift shopping experience and better ensure that important events are not forgotten.

For example, a user or customer may order an item, such as a toy, from an Internet-based merchant using an electronic catalog presented on the customer computer. Note, that though this example is based on a toy purchase, the invention may be used to predict a recipient's age and to identify event dates based on the purchase of other types of items, such as electronics, software, clothing, videos, audio recordings, and so on. In addition, this example assumes that the merchant has a customer record, including the customer's e-mail address and other information. The customer information may have been obtained via a customer registration process or using similar techniques. If, during a first year, such as 1999, a customer buys a toy as a gift for a particular recipient, the age appropriateness designation, such as an age designation of a 2–3 year old, of the toy is recorded.

An item may be explicitly designated as a gift by the customer, or it may be inferred that a purchased item is a gift. The gift inference may be based on available information. For example, if the age suitability of the purchased item is for a child under a predetermined age, such as 8 years old, it may be inferred that the item is being purchased by someone other than the child as a gift for the child, even when the shipping address and the billing address are the same. The younger the age suitability of the item, the stronger the inference that the item is being purchased as a gift. In another example, if the shipping address is different than the billing address, an inference may be made that the item is being purchased as a gift. In addition, the gift inference may also be at least partly based on the type of item being ordered and/or the date of ordering. For example, it may be inferred that all toys purchased one week before Christmas are being purchased as a gift. In another example, it may be inferred that all toys, whenever purchased, are being purchased as gifts. The age appropriateness designation may be provided by the manufacturer, an independent service, or the merchant itself. The age appropriateness of an item may be based on the item type or function. For example, all bibs may be designated as having an age appropriateness of 0–3 years. The age designation may also be provided to the customer in the toy description, or the toy may simply be part of toy categorization based on age appropriateness designations. Based on the age appropriateness designation in this example, an initial inference may be made by an age/event inference application executing on a computer that the recipient is 2 or 3 years old. If a new toy purchase is made for the recipient at about the same period the next year, the year 2000, and the new toy's age appropriateness designation is 4–5 years, then it may be inferred that the recipient's age is 4 years. This inference is made because it most closely matches the aging of a child for which the two toys were bought. This updated or improved inference is then recorded. Of course, this system of estimating age ranges is not limited to gifts. For example, if a child orders toys, books, or software for herself or himself, the age designations associated with the ordered items may be used to determine the child's age.

The preciseness of the age inference may depend on the preciseness of the age appropriateness designations of the gifts. For example, if in a first year a gift with an age appropriate designation of 4–7 years old was purchased, and the next year a gift with an age appropriate designation of 5–9 years old was purchased, it may be inferred that the recipient is between 5–8 years old, as that age range spans the age designations of both gifts. Of course, based on future purchases, the age inference can be further refined or corrected. The age inferences may have associated probabilities related to the confidence level of the inference. As additional information is obtained via additional item purchases for the recipient and/or based on customer feedback and corrections, these probabilities may be automatically or manually adjusted accordingly. In addition, under certain circumstances, it may be inferred that the recipient's birthday is on or around the date or period the toys were ordered. Several exemplary conditions or circumstances which may allow such a birthday inference to be made will now be discussed.

If a customer annually orders a present for the recipient at about the same time or period each year, and that period coincides with a traditional gift-giving holiday, then it can be inferred that the customer desires to annually purchase a gift for the recipient for that holiday.

If, however, a customer annually orders a present for the recipient at about the same time or period each year, and that period does not coincide with a traditional gift-giving holiday, such as Christmas or Chanukah, then it may be inferred that the period coincides with an annual non-holiday event at about that time which occasions the giving of a gift. For example, the annual event may be the recipient's birthday. Optionally, such an inference may be made only after items have been purchased for the recipient for more than a certain number of consecutive years, such as three or four years, during the same period. If the customer has ordered an item during that historical gift giving period and requested a rush delivery, such as overnight or two day delivery, then an inference can be made that the gift giving event is very proximate, such as within 1 week, to the order date.

An even stronger inference of a birthday or other event may be made based on other information derived from the customer's gift order. If the customer requests that a greeting card and/or wrapping paper be provided with the gift, the type of card and/or wrapping paper requested may be used to infer or deduce the event which occasioned the gift. For example, if the customer ordered a birthday card and/or birthday gift wrapping, the age/event inference application will determine that the gift recipient's birthday is what instigated the gift giving. If, instead, an anniversary card was ordered, it may be inferred that the recipient's anniversary is what occasioned the gift.

Similarly, if a customer provides a message to accompany the gift, such as on a card, the message may be parsed for key words. Key words may include event related references such as "birthday," "anniversary," or "kwanza." From those key words, the age/event inference application can infer or deduce the event or holiday that is associated with the gift.

The inferred event and the date or period associated with the inferred event may also be stored in association with the recipient's name or other identification and in association with the purchasing customer's account. This information can then be retrieved in order to provide customer reminders and to display appropriate gift selections to the customer, as described below.

In one embodiment, the customer can correct or update an inferred age and/or the inferred date of a gift giving event. By activating a corresponding link, a Web site page form is presented that allows the customer to correct the inferred age and/or event date. The corrected information is then stored for later use by the age/event inference application to more accurately provide customer reminders at the correct times and may also be used by an item or gift recommendation application to more accurately select age appropriate gift suggestions.

In one embodiment, even if the recipient age cannot be inferred from the gift item, if the event can be inferred then that inference will be recorded. Similarly, if the event cannot be inferred, but the recipient age can be inferred, then the age inference will be recorded.

Based on the inferred event, a reminder may be provided to the customer in following years or periods regarding the inferred event. The reminder may be in the form of an e-mail or may be presented on a Web page associated with the merchant when the customer visits the corresponding Web site. If the customer gives permission, the reminder may also be placed on the customer's electronic calendar, such as that associated with Planetall.com, Microsoft® Outlook, or with the Palm® Pilot calendar, stored on the customer's computer, phone, personal digital assistant, or the like. If the event type has been inferred, the reminder may also note the event type. If the event type cannot be determined with sufficient reliability, then the reminder may indicate that an important event related to the recipient is upcoming, without specifying what that event is.

If the event date can be precisely identified, such as by examination of previous requested gift delivery dates or using other techniques, that date may be noted as well in the reminder. Otherwise, the reminder may indicate that a gift-giving occasion is nearing, without giving a specific date. In addition, the reminder may list previous items or gifts provided to the recipient by the customer or by others, and the dates those items or gifts were ordered or delivered. This helps ensure that the recipient will not receive unwelcome duplicate gifts and may help the customer further identify for what occasion the gifts were purchased for.

If an e-mail is used to provide the reminder, the e-mail may include a link to a Web page providing information and/or recommendations, via lists or other displays, on age appropriate or suggested gifts for the recipient.

As previously discussed, in addition to, or in place of the e-mail reminder, information on age appropriate and/or suggested gifts may be provided on a Web page when the customer visits the merchant site associated with previous gift giving or which has information related to previous gift giving. In one embodiment, the information may be displayed for customer-viewing only proximate in time, such as within one month to an inferred or otherwise determined gift-giving period. As previously discussed, the gift giving period may be related to the recipient's birthday or to a gift-giving holiday, such as Chanukah or Christmas.

By way of example, such a display may be presented to the customer one month prior to a gift-giving anniversary date, as determined from prior annual gifts, or one month prior to an inferred or determined event date, such as a birthday or Christmas. The display may be discontinued once a gift has been purchased, once the gift-giving date or period has passed, or once a predetermined period after the gift-giving date or period has passed.

Where the inferred age and/or event are not deemed sufficiently reliable to make an explicit recommendation, an implicit recommendation may nevertheless be made. For example, items, such as toys, may be displayed to the customer when visiting a merchant's starting web page. In addition, if the customer is performing a search, such as a search for construction toys, the list or display of toys found by the search may be automatically ranked according to their respective age appropriateness designations, so that toys appropriate for the recipient are presented first.

In another embodiment, the display or list of age appropriate items may be presented to the customer each time the customer visits the merchant site, regardless of the proximity in time to an event date. However, the display may change annually or more often based on the inferred or deduced increasing age of the recipient and/or based on changing inventories and availability of products or services.

When a customer uses multiple shopping carts under a single account (such as shopping carts for different family members, including children), the items purchased using a given cart may be examined, and the age of the family member associated with the cart may be inferred. Further, depending on which cart is being used, recommendations that are specific to a particular shopping cart are generated. (see, for example, U.S. patent application Ser. No. 09/156,237, filed Sep. 18, 1998, which describes aspects of Amazon.com's system and method of using multiple shopping carts, and which is hereby incorporated by reference in its entirety). For example, if the cart associated with a 4 year old is being used, then toys with age appropriateness designations that include 4 year olds may be presented. If, instead, a cart associated with a 15 year old is being used then items appropriate for 15 year olds, such as age appropriate video games or rock CDs may be presented.

In addition, wish lists, such as are commonly used at many Internet merchant sites, generated by or for an item recipient may examined to infer the recipient's age. For example, the age appropriateness of the wish list items can be used to determine the recipient's approximate age. In addition, the contents of the wish lists may be used to better refine item recommendations so as to recommend items similar to those on the wish list. The item recipient's wish list may be located based on the item recipient's name, address, and/or age and the like, and comparing that information with a wish list database to determine if a match can be found. If the item recipient is also the purchaser, the purchaser's cookie may be examined to locate a corresponding wish list. In one embodiment, the types of gifts previously purchased for the recipient may be examined by the age/event inference application and a gift recommendation application, and based on that examination, a page displaying or listing similar items may be presented as well. In addition, gift items previously purchased may be eliminated or inhibited from being displayed in the suggested gift list. In one embodiment, both the inferred age of the recipient as well as the types of previous items purchased for the recipient may be used to automatically generate a list or display of suggested items that may make appropriate gifts. For example, if the recipient previously received LEGO® building blocks sets as gifts, a list of LEGO® or other building blocks sets with suitable age appropriateness designations may be displayed.

If the gift recipient and/or the recipient's household members are also customers and can be identified as such, then examination of the related or similar item purchases made by the recipient or for the recipient by the household members can also be performed to further refine the gift recommendations. In addition, any associated reviews provided by the gift recipient or the purchaser for those past purchases may also be used in determining what gift items should be recommended to the gift giver.

Further, reviews can be used to more accurately determine a recipient's age. For example, reviews provided by a household member, such as a parent, of the gift recipient may include a reference to the age of the gift recipient. The review might state, for example, "my 2 year old just loves this video!" These reviews may be parsed for such age references, and the age reference may then be used to identify the recipient's age.

In addition, these reviews may be used to recommend similar items, such as similar videos, to the purchaser. The identification of the gift recipient or members of the recipient's household as being customers may be accomplished by examining past order information, including the gift recipient name, address, age and the like, and comparing that information with the customer database to determine if a match can be found.

Reviews provided by the gift recipient, purchaser, and/or household member for previously purchased items may also be used to build or supplement a customer profile for that gift recipient. The customer profile may then be used to recommend other potential gifts, such as other books, to the gift giver based on the previous purchases and item reviews and ratings. For example, a collaborative recommendations algorithm may be used to recommend items based on the item rating profiles of such gift recipient customers. Collaborative filtering or recommendation systems operate generally by asking each user or customer to rate items, such as products or services, the user is familiar with, and then storing the user ratings within user-specific rating profiles. To identify the items that may be of interest to a particular user, the user's rating profile is correlated with the profiles of other users to identify users with similar tastes.

For example, in the context of online book sales, suppose that a first user dislikes title 1, is indifferent about title 2, and likes titles 3 and 4; and that a second user dislikes title 1, is indifferent about title 2, likes title 3, and has not yet read title 4. A collaborative filtering system might use this information to predict that the second user will like title 4. When applied over large databases of user ratings data, this type of analysis can produce predictions that are valuable to both users and merchants.

The items rating profiles may be generated through a combination of the methods described herein and other known methods for prompting users to rate items (see, for example, U.S. patent application Ser. No. 09/040,171, filed Mar. 17, 1998, which describes aspects of Amazon.com's BookMatcher service and which is hereby incorporated by reference in its entirety).

In addition, the type of item previously purchased may be used to infer the gender of the recipient. For example, if the purchased toy was a dress for a doll, it may be inferred that the recipient is a girl. This inferred gender identification may be used to further refine the list or display of suggested items presented to the consumer. In addition, the gender information may be used in determining which gift wrapping colors and patterns should be suggested when the item is being purchased as a gift. For example, if it is inferred that the recipient is a girl, pink or pastel colored gift wrapping may be suggested first.

If the consumer purchases gifts from a merchant for multiple recipients, the recipients' ages and/or any corresponding events may also be inferred if there is sufficient information. The following example will be used to illustrate the inference process. In a first year, a customer purchased a gift with an age appropriateness of 1 in February for a first recipient, and then purchased a gift with an age appropriateness of 4 in May for a second recipient. The next year, the customer purchased a gift with an age appropriateness of 2 in February for the first recipient, and purchased a gift with an age appropriateness of 5 in May for the second recipient. From this information, it may be inferred that the first recipient's birthday is in February and the first recipient was about 2 years old when the second gift was purchased for the first recipient. Furthermore, it may be inferred that the second recipient's birthday is in May and the second recipient was about 5 years old when the second gift was purchased for the second recipient.

Even when the customer does not specify that the various gifts are being purchased for two different recipients, it may inferred from the age appropriateness of previously purchased items in the customer's purchase history that there are two gift recipients. Thus, if the customer buys at the same time a first item with an age appropriateness of 1 to 3 years, and a second item with an age appropriateness of 8 to 10 years, it may be inferred that the two items are intended for two different recipients.

Using this inferred information, the merchant can appropriately list, highlight, categorize, recommend or otherwise emphasize gifts that are age appropriate for both the recipients each time the customer visits the merchant's Web site. Such emphasis may be provided in association with the corresponding recipient's name and age. For example, a list of suitable toys and books for the first recipient may be titled "Suggested Toys And Books That Would Bring A Smile To Joseph Doe, age 2!" Similarly, a list of suitable toys and books for the second recipient may be titled "Suggested Toys And Books That Would Bring A Smile To Jacob Doe, age 5!"

Alternatively, gifts appropriate for the first recipient may be emphasized to the customer only or optionally within a predetermined period, such as 2 weeks, 1 month, 6 weeks, or 2 months, before the first recipient's inferred birthday or other gift giving event. Similarly, gifts appropriate for the second recipient may be emphasized to the customer for a predetermined period before the second recipient's inferred birthday or other gift giving event.

Thus, the present invention provides many important benefits. Customers may be provided reminders of important events, thereby avoiding the embarrassment that ensues when one forgets such events. Further, providing customers with information on selected appropriate gifts helps ensure that gift recipients, such as children, grandchildren, wives, are not disappointed by unsuitable gifts. In addition, the gift purchaser need not remember or track a child's age. By providing appropriate suggestions and recommendations, such as age appropriate gift suggestions, gift recipient satisfaction is increased. Merchants benefit, because customers are more likely to purchase items from the merchant as a result of the merchant-provided reminders and the gift suggestions. In addition, because recipients are more likely to be satisfied with the age appropriate gifts, there will be fewer item returns, thereby reducing merchant costs.

In addition to using the inferred age and/or event information to provide item recommendations, the inferred age and/or event information may be used to selectively provide targeted advertising to the item purchaser and/or recipient. For example, at about an inferred gift giving event period, targeted ads may be presented to a purchaser for the types of items that are typically are, or have previously been given by the purchaser, as gifts. In one embodiment, banner ads for a toy store may be presented to a customer preceding an inferred or known child's birthday. The ads may specifically display information about specific age appropriate toys. These ads may be presented over the Internet, on interactive television systems, on cell phones, wireless personal digital assistants (PDAs), or the like.

One embodiment of the incentive system will now be described in greater detail with reference to FIGS. 1–6. Throughout the following description, reference will be made to various implementation-specific details, including, for example, coding conventions, document and protocol standards, e-mail or Web event reminders, and displays of suggested gifts. These details are provided in order to fully set forth a preferred embodiment of the invention, and not to limit the scope of the invention. The scope of the invention is set forth in the appended claims.

For purposes of illustration, the merchant Web site in the disclosed implementation is the Web site of Amazon.com. As is well known in the field of Internet commerce, the Amazon.com site includes functionality for allowing users to browse and make online purchases from a catalog of millions of book titles, as well as to purchase toys, games, electronics, music, videos, home improvement items, auction items, and the like. As described below, the site includes an item or gift recipient database that stores recipient's names, actual or inferred recipient ages, gift giving event dates or periods, lists of previously received items, recipient preferences and other information about when reminders should be sent to customers. In other embodiments, the items available for purchase from the Web site may, for example, include items available for rent and downloadable items such as software programs and digital publications.

FIG. 1 illustrates a first exemplary e-mail message from a merchant, or a company associated with the merchant, reminding a customer 110 of an upcoming event associated with an individual for whom the customer had previously purchased a gift. The e-mail may be automatically generated and sent to the customer a selected amount of time before the actual or inferred event date. As depicted by FIG. 1, the e-mail specifies for which prior gift recipient 102 the reminder is being sent, the event 104 associated with the reminder, the inferred or actual event period 106, in this example "the next few weeks," and a list of presents previously purchased by the customer for the recipient and the dates on which the gifts were purchased. The inferred age 108 of the recipient is also provided. The recipients age is continuously tracked, and each year the inferred age will increase by one year. A complete or partial list of gifts purchased for the recipient may be provided as well. Links 116, 118 to a correction form, such as that illustrated in FIG. 4, may be activated by the customer to correct the inferred age and to correct or more narrowly specify the inferred event date or period and the inferred event type. The correction form will be discussed in greater detail below.

In addition, the e-mail message optionally includes a link 114, in this example in the form of an underlined word or phrase, to a merchant Web site. Assuming the customer has access to the Internet, activating the link 114 will cause the customer's browser to present an automatically, merchant-generated Web page providing information and/or suggestions on age appropriate gifts suitable for the gift recipient. Of course in other embodiments, no reminder need be sent. Further, if a reminder is sent, it may optionally include only some or all of the features and information illustrated in FIG. 1.

FIG. 2 illustrates an exemplary Web site page displaying age appropriate gifts for the recipient referred to in the e-mail illustrated in FIG. 1. In this example, separate lists 210, 212 are provided for toys and books. Activating a hyperlink, in this example in the form of an underlined word or phrase, on the page causes the customer to be presented with additional information related to the underlined word or phrase. Of course other hyperlinks, represented by a figure, graphic, or the like may be used as well.

The Web page illustrated in FIG. 2 may be automatically generated and presented to the customer in response to activating the corresponding link in the e-mail reminder or in response to the customer otherwise visiting or accessing the merchant site. The merchant or site operator can determine that the customer is visiting the site by reading the customer's cookie or by the customer logging onto the site. The page illustrated in FIG. 2 displays the intended recipient's name 202, the recipient's inferred or actual age 208, the inferred or actual related gift giving event 204, the inferred or actual event date or period 206, a partial or complete list of gifts 214 previously purchased by the customer for the recipient, and the purchase dates of those gifts. Links 216, 218 are links to correction forms, such as that illustrated in FIG. 4, and may be activated by the customer to correct the inferred age and/or event, and to correct or more narrowly specify the inferred event date or period.

Figure 3:
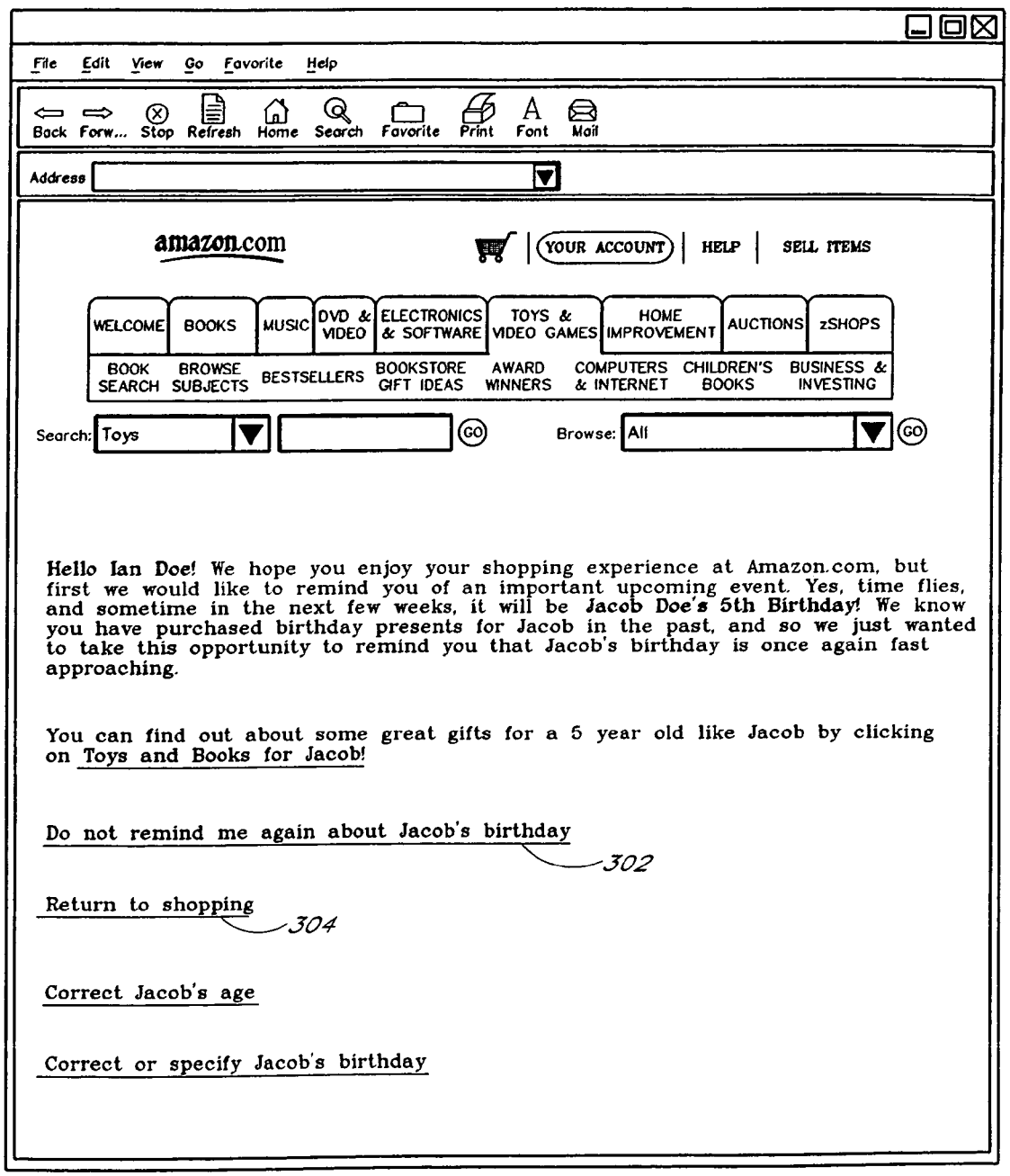
FIG. 3 illustrates an exemplary Web site page used to remind a customer of an upcoming event associated with gift giving.

FIG. 3 illustrates an exemplary Web site page used to remind a customer of an upcoming event associated with gift giving. As with the e-mail reminder, this reminder page displays the customer's name, the intended recipient's name, the recipient's inferred or actual age, the inferred or actual related gift giving event, and the inferred or actual event date or period of the gift giving event.

In addition, if the customer activates a "no more reminders" link 302, no further reminders regarding the recipient's birthday will be provided. In one embodiment, when the link is activated additional reminders will only be provided in future years. In another embodiment, no further reminders regarding the recipient's birthday will ever be provided by the associated merchant unless the customer requests such reminders. The customer can also bypass the reminder each time it is presented by activating a "return to shopping" link 304. Links to an age and event date correction form are also provided.

Figure 4:
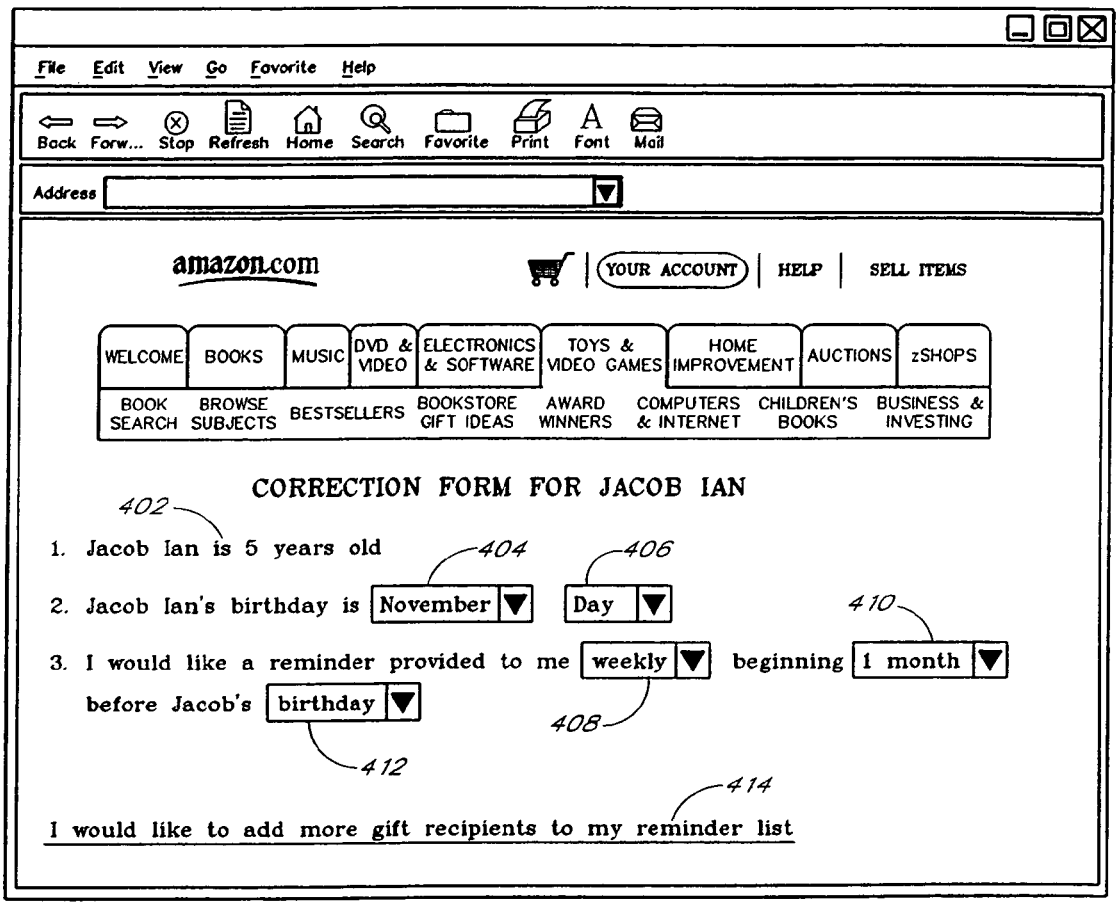
FIG. 4 illustrates an exemplary Web site page form allowing a customer to correct an inferred age and/or event date.

FIG. 4 illustrates an exemplary Web site page correction form allowing a customer to correct an inferred age and/or to correct and more narrowly specify and inferred event date or period. The correction form may be accessed via one of the links 116, 118, 216, 218 described above or via a menu on a merchant site Web page.

If the correction form was accessed via an age correction link 116, 216, then an editable age field 402 [not shown] is provided, with the current inferred age displayed. The customer may then overwrite the inferred age with the correct age. The event date fields 404, 406, in this example the recipient's birthday, will be displayed as plain, uneditable text [not shown], reciting the inferred or actual event date or period. The customer may also correct the event type using an event field 412. For example, the customer can specify that the event is a non-standard holiday, an anniversary, and so on. The customer may also specify how often and when reminders should be provided in corresponding fields 408, 410. In one embodiment, a customer may select the reminder frequency and how long before the event the first reminder should be provided using drop-down menus or the like. Of course, direct data entry using voice entry or by typing in the relevant information may used as well. Activating a "new recipient" field 414 on the correction form allows the customer to add the names and relevant information, such as age and event dates, of additional gift recipients using a form, e-mail, or the like.

If the correction form was accessed via an event date correction or specification link 118, 218, then the age field 402 will be in the form of uneditable text, with the current inferred age displayed. The event date fields 404, 406, in this case the recipient's birthday, will be displayed as editable fields using, in this example, drop down menus. Of course, other date entry techniques may used as well. The editable fields will initially recite the inferred event date or period.

Figure 5:
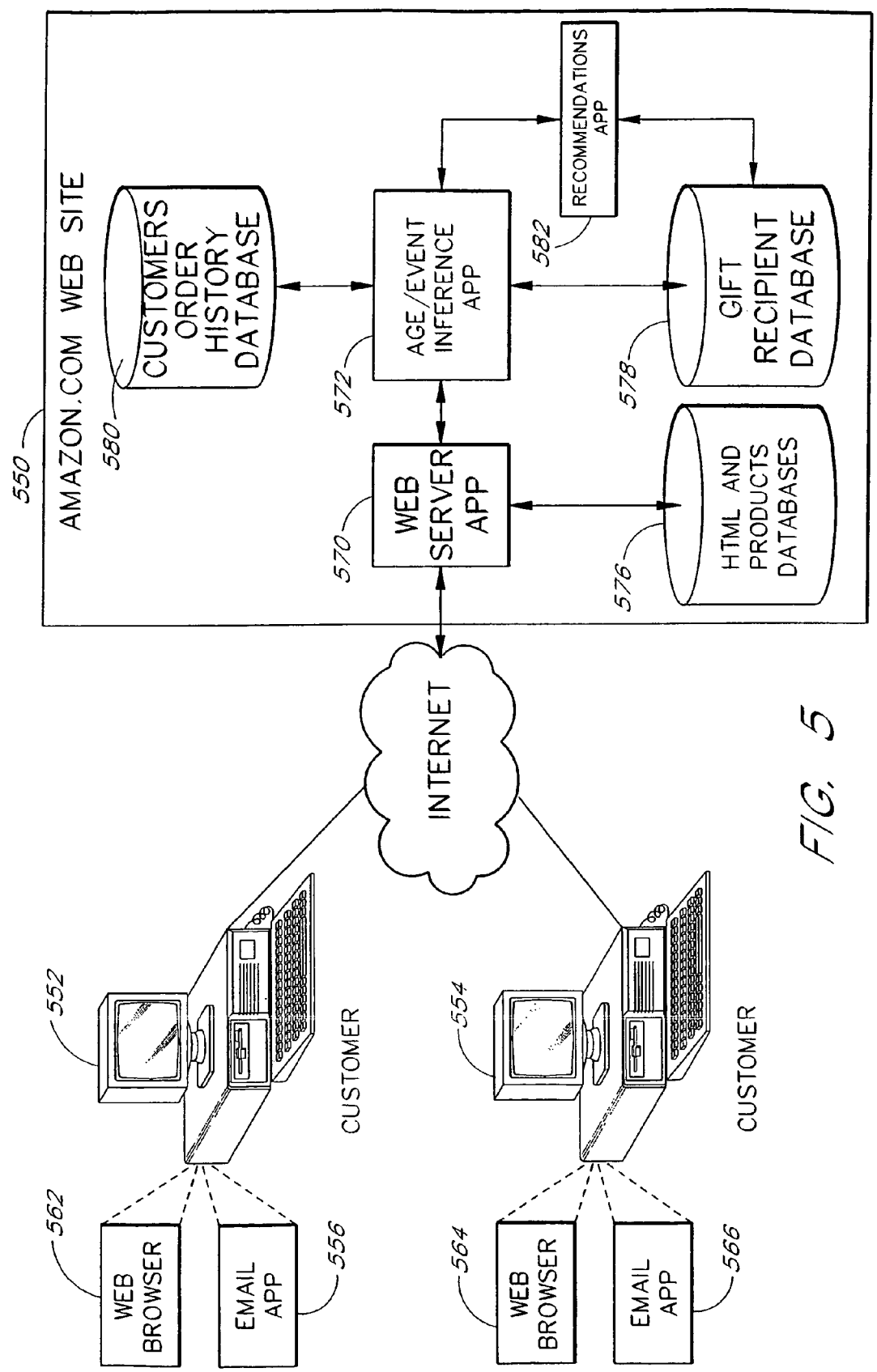
FIG. 5 illustrates an exemplary commerce system, including Web components for implementing an age/event inference system in accordance with one embodiment of the invention and illustrates typical user components for accessing the system.

FIG. 5 illustrates the basic hardware and software components that are typically invoked during the above-described process. As depicted by this drawing, customers access the Web site 550 using respective PCs 552, 554 or other general-purpose computers that have access to the Internet. The customers may alternatively access the Web site 550 using special purpose devices. The customer computers 552, 554 may run commercially-available Web browser applications 562, 564 such as Microsoft Internet Explorer® or Netscape Navigator®, which implement the basic World Wide Web standards such as HTTP and HTML.

The computers 552, 554 may also run a commercially available e-mail application 556, 566, such as Microsoft Outlook® or Netscape Navigator®, which may be used to receive communications from the merchant-related Web site 550. For example, the e-mail application 556, 566 may be used to receive gift reminders, as previously described. The e-mail applications 556, 566 and the browsers 562, 564 may be integrated with one another, and/or may be integrated with other application programs or the operating system.

In the embodiment described herein, the Web site 550 includes a computer system and associated content that are accessible via the Internet. The Web site 550 may optionally include content that spans multiple Internet domains, and/or may be implemented using physical servers that are geographically remote from one another. In other embodiments, the Web site 550 may be in the form of an intranet site, in which case the computers 552, 554 may be coupled to the site solely by a private network. For example, Web site 550 may be in the form of an internal corporate store site for company employees.

In other embodiments, the Web site 550 may be replaced with another type of network site. For example, the various services described herein could alternatively be implemented on a hypertextual site or browsing area of an online services network such as America Online® or MSN®, or using interactive TV, in which case users may access the site using software that implements non-standard document formats and transfer protocols.

As further depicted by FIG. 5, the Web site 550 includes a commercially-available Web server application 570. The Web server application 570 accesses an HTML and products database 576 used to generate Web pages in response to the actions of end users and which keeps track of product information, including age appropriateness designations, and inventories. Various other back-end components (not shown) are also used for this purpose.

The Web site 550 also includes an age/event inference application 572 which includes the basic functionality for inferring a gift recipient's age based on the customer's order history, including age appropriate for the gift recipient. Based at least in part on the customer's order history of gifts for a recipient, one embodiment of the age/event inference application 572 also infers the date or period of gift giving events, and what those events are. The age/event inference application 572 accesses a gift recipient database 578. The gift recipient database 578 stores recipient's names, actual or inferred recipient ages, actual or inferred gift giving events, and actual or inferred gift giving event dates or periods, lists of previous gifts given by a variety of purchasers, recipient preferences, and information about when event reminders should be sent to customers.

As discussed above, the age/event inference application 572 analyzes the order history of items for a particular recipient, including the types of previously ordered items, their age appropriateness designation, when the items were ordered, and what type of delivery was requested. Based on this analysis, the age/event inference application 572 infers or deduces the recipient's approximate age, the periods or dates of gift giving events, and/or the identity of the gift giving event. From this inferred or deduced data, the age/event inference application 572 provides the customer with reminders regarding upcoming gift giving events. In addition, based on the recipient's age and past gifts, as well as gender information, if available, a recommendation application 582 determines which potential gifts are age and/or gender appropriate gifts and provides age and/or gender appropriate gift suggestions and recommendations, as well as age and/or gender appropriate gift wrapping suggestions. Thus, one embodiment of the present invention advantageously infers birth date periods, automatically provides event reminders, and automatically presents age-appropriate items, thereby providing a more efficient and pleasant shopping experience.

Figure 6:
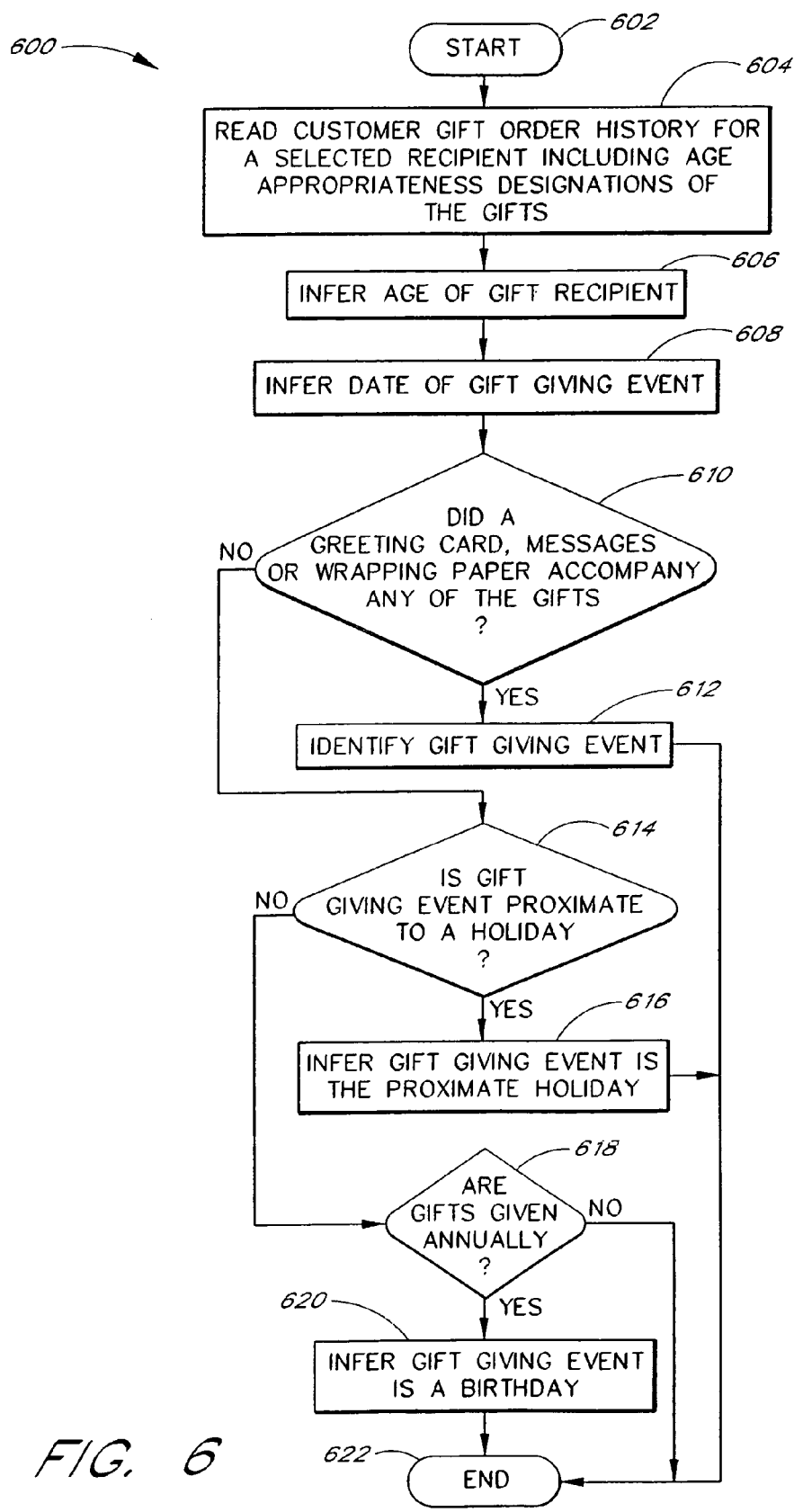
FIG. 6 illustrates an exemplary sequence of acts that are performed by the age/event inference application illustrated in FIG. 5.

FIG. 6 illustrates an exemplary sequence of steps 600 that are performed by the age/event inference application 572 to determine a gift recipient's age and the timing of a gift giving event. This process 600 executes after the customer has placed an order for an gift item, such as a toy or book for a recipient. Beginning at state 602, the process 600 proceeds to state 604 where the process 600 reads the customer's order history of items or gifts for a particular person or recipient. The order history includes the corresponding age appropriateness designation of those gifts and the date the gifts were ordered. The order histories of others who purchased items for the recipient may also be read. Furthermore, aggregate order histories from multiple merchants related to items purchased for the recipient may be read as well. Of course, rather than retrieving the age appropriateness designations from the customer order history, the age appropriateness designations can be dynamically retrieved while executing the process 600 from a different database, such as the manufacturer's database. At state 606, an inference is made from the age appropriateness designations as to the current age and/or the birth date or birth year of the recipient. At state 608, based on the dates or period the items or gifts where ordered, an inference is made as to the timing or date of a gift giving event.

At state 610, a determination is made as to whether a message, greeting card, and/or wrapping paper accompanied one or more of the items or gifts. If yes, then based on the messages, greeting card, and/or wrapping paper, at state 612 a determination and identification is made as to what occasioned the gift giving, and that determination is stored in associated with the recipient's name or other identification in a recipient record. The process then ends at state 622. Otherwise, proceeding to state 614, a determination is made as to whether the gift giving event corresponds to a holiday based on the proximity of the order dates to a holiday, such as Christmas. If yes, then at state 616, an inference is made that the gift giving event is the proximate holiday, and the event inference is stored in association with the recipient's record. Otherwise, at state 618, if it is determined that gifts are given annually at about the same time each year, then an inference is made at state 620 that the gift giving event is a birthday. This inference is stored in the recipient record. The process then proceeds from state 620 to state 622, where the process 600 ends. If the gifts are not given annually at about the same time, the process proceeds directly from state 616 to the end state 622, and no event inference is made. As discussed above, based at least in part on the inferred ages, events, and event dates, reminders and appropriate gift suggestions are provided to the customer.

Thus, as discussed above, in one embodiment, based on an order history the present invention advantageously automatically infers ages and gift giving events, automatically provides event reminders, and/or automatically suggests age-appropriate gifts, thereby increasing customer satisfaction and merchant sales.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A method of using a customer order history to infer a recurring event associated with gift giving to a gift recipient, the method comprising:
   in a first year, receiving over a network a customer order for a first gift for the recipient;
   in a second year, receiving over a network a customer order for a second gift for the recipient;
   using a computer to infer a periodic gift-giving event based at least in part on a timing of the first order and a timing of the second order; and
   using a computer to provide a gift-giving reminder to the customer in a third year at a date selected based at least in part on the timing of the first order and timing of the second order.

2. The method as defined in claim 1, wherein the reminder is in the form of an e-mail message to the customer.

3. The method as defined in claim 1, wherein the reminder is in the form of a Web page presented to the customer when the customer visits a Web site associated with a merchant who received the customer order for at least the first gift.

4. The method as defined in claim 1, wherein the customer designates the first gift as a gift.

5. The method as defined in claim 1 wherein the customer does not designate the first gift as a gift, and further comprising automatically inferring that the first gift is a gift.

6. The method as defined in claim 1, wherein the third date occurs a predetermined amount of time before an anniversary of the date of one of the first or second orders.

7. The method as defined in claim 1, the method further comprising providing the customer with a list of items previously ordered for the recipient in conjunction with the gift-giving reminder.

8. The method as defined in claim 1, further comprising automatically inferring the type of gift-giving event.

9. The method as defined in claim 8, wherein automatically inferring the type of gift-giving event is based at least in part on a gift wrap request.

10. The method as defined in claim 8, wherein automatically inferring the type of gift-giving event is based at least in part on a message to be enclosed with the first gift.

11. The method as defined in claim 8, wherein automatically inferring the type of gift-giving event comprises determining if the first order date and the second order date are proximate to a holiday and if not, inferring that the gift-giving event is the recipient's birthday.

12. The method as defined in claim 8, wherein automatically inferring the type of gift-giving event comprises determining if the first date and the second date are proximate to a holiday and if so, inferring that the periodic gift-giving event is the proximate holiday.

13. The method as defined in claim 8, further comprising:
   receiving a customer correction to the inferred gift-giving event type; and
   storing the correction.

14. A method of using a customer order history to electronically infer an event associated with gift giving to a recipient, the method comprising:
   at a first date, receiving over a network a first customer order for a first gift for the recipient;
   at a second date, receiving over the network a second customer order for a second gift for the recipient;
   using a computer to infer that a periodic gift-giving event occurs within a first period of time based at least in part on a time interval between the first date and the second date; and
   using a computer to provide a gift-giving reminder to the customer at a third date selected based at least in part on the first period of time inferred from the first date and the second date.

15. The method as defined in claim 14, further comprising determining if either the first order or the second order specified expedited shipping, and if so, inferring that the gift-giving event is more proximate to the order date associated with the order that specified expedited shipping.

16. The method as defined in claim 14, further comprising inferring that the first order is for a gift based at least in part on the customer's address being different then the recipient's address.

17. The method as defined in claim 14, further comprising automatically inferring that the first gift is a gift.

18. The method as defined in claim 14, wherein the third date is a selected amount of time before an anniversary of the date of the first or second orders.

19. The method as defined in claim 14, the method further comprising, in conjunction with the gift-giving reminder, providing the customer with a list of items previously ordered for the recipient.

20. The method as defined in claim 14, further comprising inferring the type of gift-giving event.

21. The method as defined in claim 20, further comprising:
   receiving a correction to the inferred gift-giving event type; and
   storing the correction.

22. The method as defined in claim 20, wherein automatically inferring the type of gift-giving event is based at least in part on a gift wrap request.

23. The method as defined in claim 20, wherein automatically inferring the type of gift-giving event is based at least in part on a message to be enclosed with the first gift.

24. The method as defined in claim 20, wherein automatically inferring the type of gift-giving event comprises determining if the first order date and the second order date are proximate to a holiday and if not, inferring that the gift-giving event is the recipient's birthday.

25. The method as defined in claim 20, wherein automatically inferring the type of gift-giving event comprises determining if the first date and the second date are proximate to a holiday and if so, inferring that the gift-giving event is the proximate holiday.

26. The method as defined in claim 14, wherein the reminder is in the form of an e-mail message to the customer.

27. The method as defined in claim 14, wherein the reminder is in the form of a Web page presented to the customer.

28. Computer readable medium having computer executable program code embodiment thereon, said program code, when executed, causing a computer to:
   receive a first customer order for a first gift for a gift recipient;
   receive a second customer order for a second gift for the gift recipient; and
   infer that a periodic gift-giving event occurs within a first period of time, based at least in part on a time interval between the first order and the second order; and provide a gift reminder to the customer, wherein the timing of the notification is related to the first period of time.

29. The computer readable memory as defined in claim 28, further comprising code configured to determine if either the first order or the second order specified expedited shipping, and if so, to infer that the gift-giving event is more proximate to the order date associated with the order that specified expedited shipping.

30. The computer readable memory as defined in claim 28, further comprising code configured to infer that the first order is for a gift based at least in part on the customer's address and the recipient's address.

31. The computer readable memory as defined in claim 28, further comprising code configured to present a gift-related reminder to the customer via a Web page.

32. The computer readable memory as defined in claim 28, further comprising code configured to infer that the first gift is a gift.

33. The computer readable memory as defined in claim 28, further comprising code configured to provide the customer with a list of items previously ordered for the recipient in conjunction with a gift giving reminder.

34. The computer readable memory as defined in claim 28, further comprising code configured to infer the type of gift-giving event.

35. The computer readable memory as defined in claim 34, further comprising code configured to:

receive a correction to the inferred gift-giving event type; and store the correction.

36. The computer readable memory as defined in claim 34, wherein the code configured to infer the type of gift-giving event comprises code configured to determine if the first order date and the second order date are proximate to a holiday, and if not, to infer that the gift-giving event is the recipient's birthday.

37. The computer readable memory as defined in claim 34, wherein the code configured to infer the type of gift-giving event comprises code configured to determine if the first order date and the second order date are proximate to a holiday, and if so, to infer that the gift giving event is the proximate holiday.

38. The computer readable memory as defined in claim 28, further comprising code configured to infer the type of gift-giving event based at least in part on a gift wrap request.

39. The computer readable memory as defined in claim 28, further comprising code configured to infer the type of gift-giving event based at least in part on a message to be enclosed with the first gift.

40. The computer readable memory as defined in claim 28, further comprising code configured to provide a gift-giving reminder in the form of an e-mail message to the customer.

* * * * *